United States Patent
Gaillot et al.

(10) Patent No.: US 9,488,106 B2
(45) Date of Patent: Nov. 8, 2016

(54) ASSEMBLY FORMED BY A TURBINE ENGINE AND A SYSTEM FOR ATTACHING IT TO AN AIRCRAFT STRUCTURE

(75) Inventors: Mathieu Gaillot, Paris (FR); Jean Bertucchi, Thiais (FR); Matthieu Leyko, Melun (FR)

(73) Assignee: SNECMA, Paris (FR)

( * ) Notice: Subject to any disclaimer, the term of this patent is extended or adjusted under 35 U.S.C. 154(b) by 403 days.

(21) Appl. No.: 14/241,246

(22) PCT Filed: Aug. 24, 2012

(86) PCT No.: PCT/FR2012/051930
§ 371 (c)(1),
(2), (4) Date: Feb. 26, 2014

(87) PCT Pub. No.: WO2013/030498
PCT Pub. Date: Mar. 7, 2013

(65) Prior Publication Data
US 2014/0202169 A1    Jul. 24, 2014

(51) Int. Cl.
*F02C 7/20* (2006.01)
*B64C 7/02* (2006.01)
*B64D 27/26* (2006.01)

(52) U.S. Cl.
CPC . *F02C 7/20* (2013.01); *B64C 7/02* (2013.01); *B64D 27/26* (2013.01); *B64D 2027/266* (2013.01)

(58) Field of Classification Search
CPC ............ F02C 7/20; F01D 25/24; B64C 7/02; B64D 27/26; B64D 2027/266
See application file for complete search history.

(56) References Cited

U.S. PATENT DOCUMENTS

| | | | |
|---|---|---|---|
| 4,725,019 A | 2/1988 | White | |
| 4,825,648 A | 5/1989 | Adamson | |
| 5,102,069 A * | 4/1992 | Hackett | B64D 29/02 244/130 |
| 5,275,357 A | 1/1994 | Seelen et al. | |
| 2009/0283631 A1* | 11/2009 | Roche | B64C 7/02 244/54 |
| 2011/0036942 A1* | 2/2011 | Marche | B64D 27/26 244/54 |

(Continued)

FOREIGN PATENT DOCUMENTS

| | | |
|---|---|---|
| EP | 0 257 665 A1 | 3/1988 |
| GB | 2 202 588 A | 9/1988 |

OTHER PUBLICATIONS

International Search Report issued Mar. 27, 2013, in PCT/FR12/051930 filed Aug. 24, 2012.

*Primary Examiner* — Carlos A Rivera
(74) *Attorney, Agent, or Firm* — Oblon, McClelland, Maier & Neustadt, L.L.P.

(57) ABSTRACT

In an assembly including a bypass turbine engine and an attachment system attaching the turbine engine to an aircraft structure, the attachment system includes a mast, at least two rear attachments connecting the mast to two rear attachment points of the turbine engine, and a rear covering covering the rear attachments and providing a streamlined fairing. The rear covering includes two side walls, each including a first portion extending along and in proximity of the mast and extending rearwards, and a second portion projecting sideways relative to the first portion towards its outside, to cover the rear attachments. Each second portion is substantially a bulge and is connected to the first portion along a curved connection line extending between front and rear points situated substantially level with an inner longitudinal edge of the first portion to minimize the impact on a flow of bypass stream leaving the bypass passage.

5 Claims, 2 Drawing Sheets

(56) References Cited

U.S. PATENT DOCUMENTS

2011/0127369 A1* 6/2011 Dussol .................. B64D 27/18 244/54

2012/0001019 A1* 1/2012 Morvant ................ B64D 29/02 244/54

2013/0161446 A1* 6/2013 Letay .................... B64D 27/26 244/54

* cited by examiner

ASSEMBLY FORMED BY A TURBINE ENGINE AND A SYSTEM FOR ATTACHING IT TO AN AIRCRAFT STRUCTURE

BACKGROUND OF THE INVENTION

The invention relates to an assembly comprising a turbine engine and an attachment system for attaching the turbine engine to an aircraft structure, and the invention relates more particularly to a rear covering providing a streamlined fairing for a mast and rear attachments forming part of the attachment system.

A bypass turbine engine presents an annular flow passage for the core stream coming from a gas generator and opening out at the rear around a central body, and an annular flow passage for the bypass stream coming from a fan and defined by a primary cover structure and a secondary cover structure.

Such a turbine engine is commonly attached to an aircraft structure, in particular a wing, by means of a mast, also referred to as a jet mast or a pylon, together with front and rear attachments connecting the mast to attachment points at the front and the rear of the engine, thrust-takeup links also being provided for transmitting thrust forces between the engine and the mast. Other attachment and thrust transmission devices connect the mast to the aircraft structure carrying the engine.

At the rear, a rear covering is provided for forming a streamlined fairing that protects the mast from the core stream and that covers the rear attachment.

The rear covering has two side walls that extend along and in the proximity of the mast on either side thereof and that extend rearwards beyond the rear opening of the core stream flow passage. At the front, the rear covering is arranged between the primary and secondary cover structures or at the outlet from the annular flow passage for the bypass stream. At least in its rear portion that is exposed on the inside to the core stream, the rear covering is provided with a soleplate or floor for providing thermal protection and for connecting together its side walls.

In the engines commonly in use at present, such as turbine engines of the "CFM 56" type from the supplier CFM International, the angular spacing between the rear attachment points of the engine is small enough for the streamlined fairing that is adapted to the mast also to cover the rear attachments and attachment points.

Improving the performance of turbine engines leads to envisaging a significant increase in their dimensions, and in particular in their diameter. This increase in diameter, and the resulting increase in weight, requires rear anchor points to be installed in such a manner that the distance between them becomes substantially greater than the width of the mast in the vicinity of the rear attachments.

There then arises a problem of providing a rear covering that serves to provide the mast and the rear attachment with a streamlined fairing and that gives rise to head losses that are as small as possible in order to avoid significantly affecting the specific fuel consumption (SFC) of the engine.

OBJECT AND SUMMARY OF THE INVENTION

An object of the invention is to provide a solution to this problem, and for this purpose it provides an assembly comprising a turbine engine and an attachment system for attaching the turbine engine to an aircraft structure, in which assembly:

the turbine engine is a bypass engine with an annular passage in which the core stream flows that opens out to the rear around a central body, and an annular passage along which the bypass stream flows that opens out to the rear between a primary cover and the rear end of a secondary cover; and the attachment system comprises a mast, at least two rear attachments connecting the mast to two rear attachment points of the turbine engine, and a rear covering of the mast covering the rear attachments, providing a streamlined fairing and having a rear portion that extends rearwards beyond the opening of the core stream flow passage, the distance between the rear attachment points being substantially greater than the width of the mast level with the rear attachments;

in which assembly:

the rear covering has two side walls each having a first portion extending along and in the proximity of the mast and extended rearwards, and a second portion that projects sideways relative to the first wall portion on the outside thereof so as to cover the rear attachments;

and the second portions of the side wall of the rear covering are substantially in the form of bulges and they connect to the first portions of the side wall along curved connection lines extending between front points and rear points situated substantially level with the inner longitudinal edges of the first side wall portions.

Thus, a streamlined fairing for the mast and the rear attachments can be made that has little impact on the flow of the bypass stream.

Preferably, the second side wall portions of the rear covering are connected to the first side wall portions along curved connection lines extending rearwards as far as rear points situated at or in the proximity of the outer edge of the opening of the annular flow passage for the core stream.

Advantageously, the second side wall portions of the rear covering are then profiled, in particular with curved profiles of generally concave shape to locally favor a flow of the bypass stream towards the inside and under the rear portion of the rear covering. This arrangement makes it possible firstly to obtain better protection for the rear portion of the rear covering against the core stream, and secondly to optimize thrust by directing the core stream under the mast towards the central body.

Also preferably, the second side wall portions of the rear covering are connected to the first side wall portions along connection lines from front points situated in the proximity of the primary cover substantially facing the rear edge of the secondary cover, in such a manner as to minimize the impact on the flow of the bypass stream.

In this respect, and advantageously, the second side wall portions of the rear covering occupy less than 2% of the ejection of the flow passage for the bypass stream.

BRIEF DESCRIPTION OF THE DRAWINGS

The invention can be better understood on reading the following description given by way of non-limiting indication and with reference to the accompanying drawings, in which.

DETAILED DESCRIPTION

Figure 1:
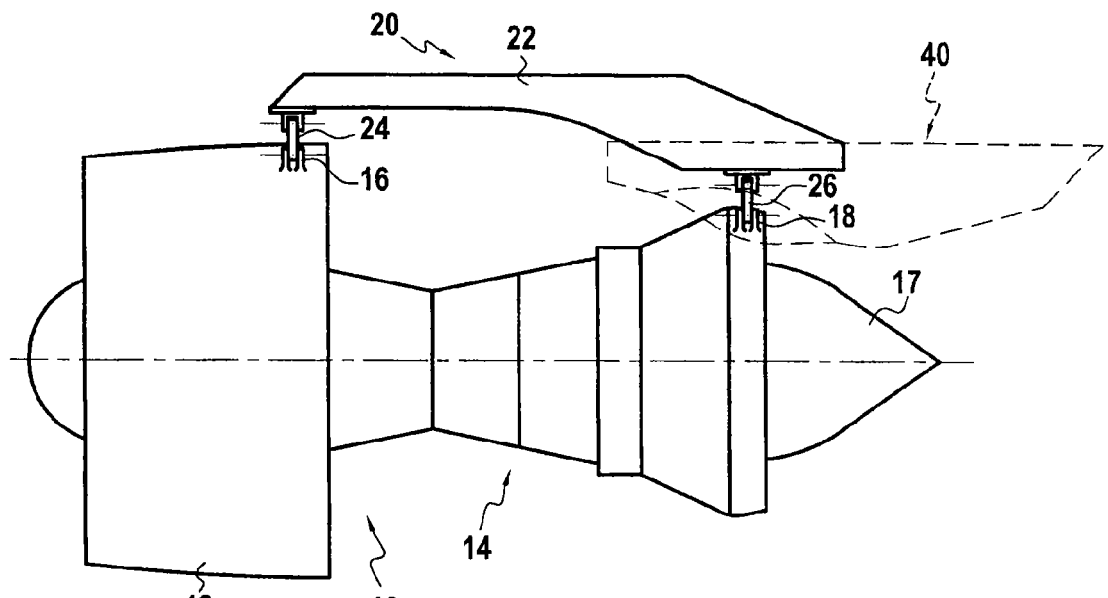
FIG. 1 is a side elevation view showing, in part and in highly diagrammatic manner, an assembly comprising a turbine engine and its system for attachment to an aircraft structure.
Figure 2:
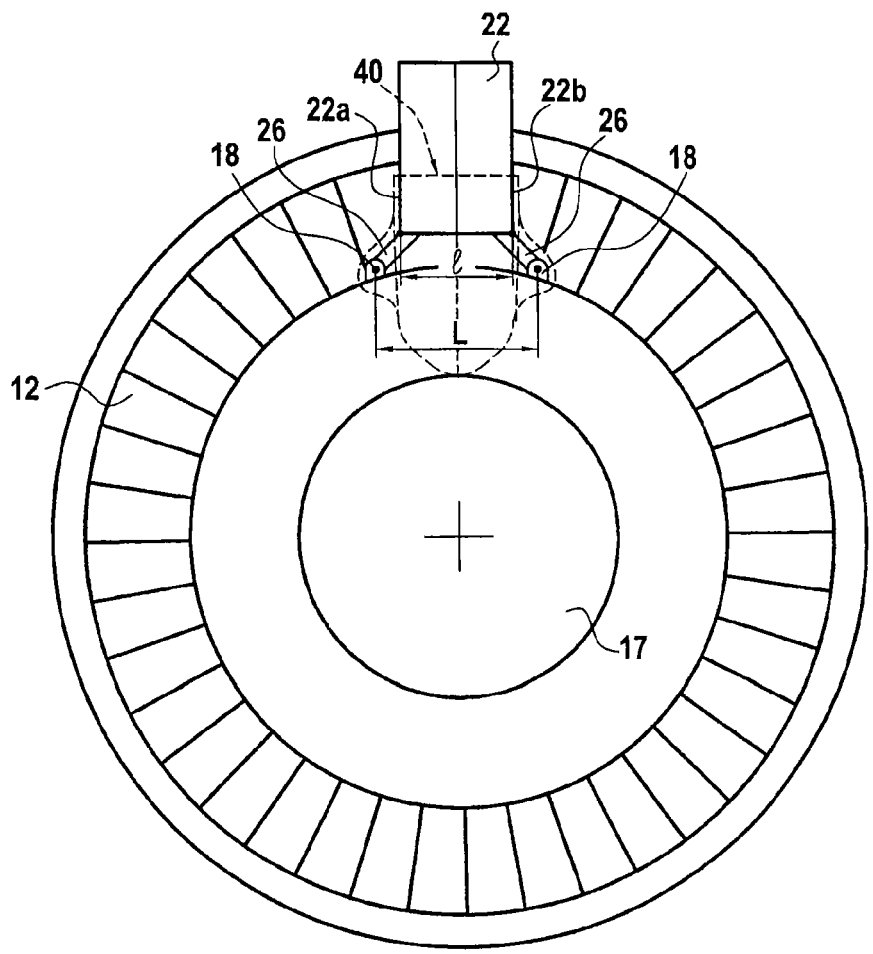
FIG. 2 is a highly diagrammatic rear view of the rear portion of the FIG. 1 assembly.

FIGS. 1 and 2 show in highly diagrammatic manner a bypass turbine engine 10 and a portion of an attachment system 20 for attaching the turbine engine to an aircraft structure, specifically an attachment system 20 enabling the turbine engine to be suspended under a wing by means of a mast 22. The devices connecting the mast to the wing are shown.

Figure 3:
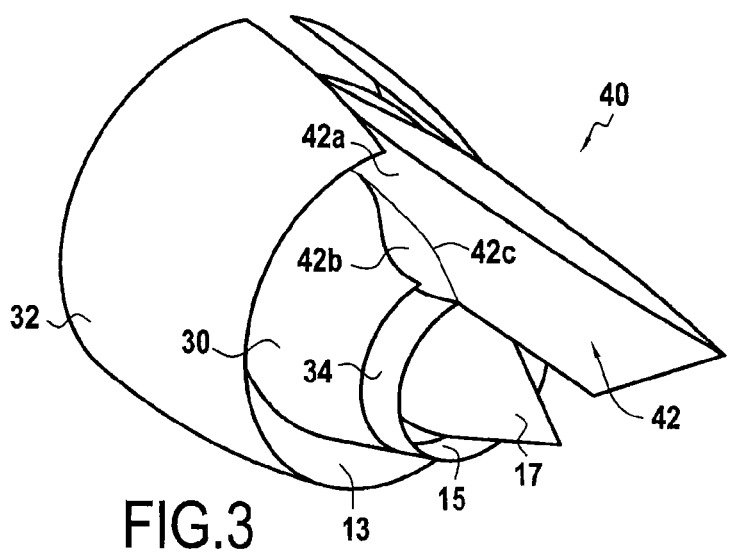
FIGS. 3 and 4 are two highly diagrammatic views in perspective showing the rear portion of the FIG. 1 assembly provided with primary and secondary covers and a rear bottom covering for the rear attachments and masks, in one embodiment.
Figure 4:
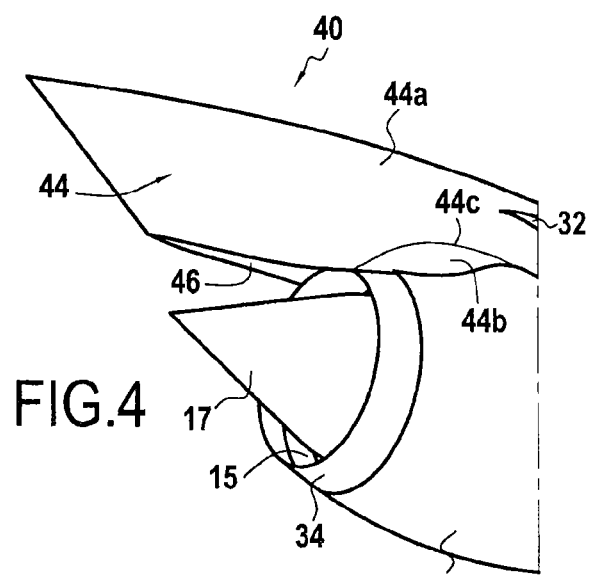
Figure 5:
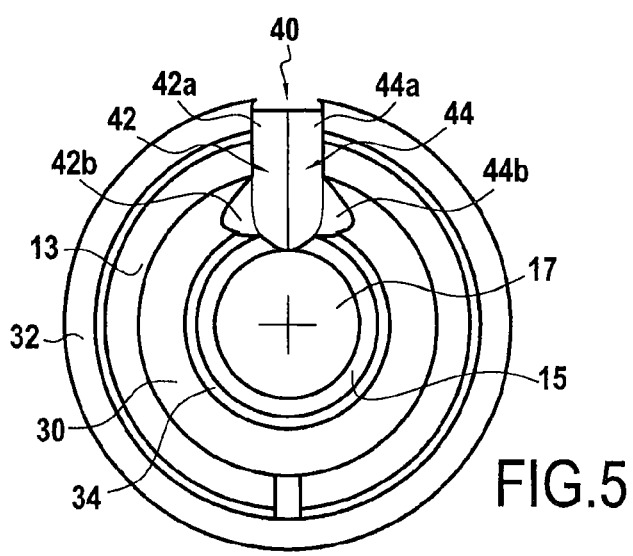
FIG. 5 is a highly diagrammatic rear view of the assembly shown in FIGS. 3 and 4.

The turbine engine 10 comprises, from the front towards the rear: a fan 12 and a gas generator assembly 14 comprising a high pressure (HP) compressor, a combustion chamber, an HP turbine, and a low pressure (LP) turbine. A bypass flow from the fan 12 flows outside the gas generator 14 in an annular passage 13 that opens to the rear between a primary cover 30 and the rear end of a secondary cover 32 (FIGS. 3 to 5). A core stream from the gas generator 14 flows in an annular passage 15 that opens to the rear around a central body 17 (FIGS. 3 to 5). The primary and secondary covers 30 and 32, which form parts of a nacelle of the turbine engine, are omitted from FIGS. 1 and 2. On the inside of the primary cover 30, an inner shroud 34 may be provided to co-operate with the primary cover 30 to define an annular passage for ejecting ventilation air used for cooling equipment situated around the gas generator (FIGS. 3 to 5).

The mast 22 (not shown in FIGS. 3 to 5) is connected to the turbine engine by means of front and rear attachments 24 and 26. The front attachments 24, e.g. in the form of two arms or links, connect the front portion of the mast 22 to front attachment points 16 situated on the fan casing 12, or on an intermediate casing when attachment is made to the low pressure compressor. The rear attachments 26, e.g. likewise in the form of at least two arms or links, connect the rear portion of the mast 22 to rear attachment points 18 situated on a casing at the rear of the turbine engine. Thrust takeup links (not shown) serve for example to connect the rear portion of the mast 22 to the fan casing 12 in order to transmit the thrust force produced by the turbine engine to the mast 22, and via the mast to the aircraft.

The mast 22 is associated with various coverings providing streamlined fairings. The only covering shown is a rear covering 40 (drawn in dashed lines in FIGS. 1 and 2) that is more particularly concerned by the invention.

The covering 40 (FIGS. 3 to 5) has a front portion that is situated between the primary and secondary covers 30 and 32 and a rear portion that extends rearwards beyond the opening of the core stream flow passage. The covering 40 has two side walls 42, 44. In the front portion of the covering 40 that extends as far as the opening of the core stream flow passage, the walls 42, 44 have inner longitudinal edges that match substantially the profile of the primary cover 30 and, possibly, the profile of the inner shroud 34 in the portion thereof that extends rearwards beyond the rear end of the primary cover 30. In the rear portion of the covering, the walls 42, 44 are connected together via their inner longitudinal edges by a soleplate 46 of material that withstands high temperatures, the soleplate 46 performing a function of providing thermal protection against the core stream to which it is exposed. At the rear end of the covering 40, the side walls 42 and 44 join together.

In the particular situation of turbine engines of relatively large diameter, the spacing between the rear attachments 18 is such that the distance L between them is substantially greater than the width l of the mast 22 level with the rear attachments 26 (FIG. 2), where the width l, or thickness, is the distance between the side faces 22a, 22b of the mast. A rear covering limited by side walls extending substantially radially in the proximity of the two sides of the rear bottom portion of the mast then cannot completely cover the rear attachments 26. Enlarging the rear covering by moving its side walls apart from the side faces of the mast would not be suitable because of the impact it would have on the flow of the bypass stream, thereby leading to a degradation in thrust performance.

It is thus proposed to make the side walls 42, 44 of the rear covering with first portions 42a, 44a that extend along and in the proximity of the rear bottom portion of the mast 22, on either side thereof and that are extended rearwards, and two second portions 42b, 44b that project sideways from the outsides of the first wall portions 42a, 44a in order to completely cover the rear attachments 26, the covering 40 being substantially symmetrical about a longitudinal midplane. The second portions 42b, 44b of the wall are substantially in the form of bulges that are connected to the first portions along curved connection lines 42c, 44c that extend between front and rear points situated substantially at the inner longitudinal edges of the first wall portions 42a, 44a.

The connection lines 42c, 44c preferably extend as far as rear points situated at or in the proximity of the outer edge of the opening of the core stream flow passage, specifically at or in the proximity of the rear edge of the intermediate casing 34. The second portions 42b, 44b of the side wall are exposed to the bypass flow. Because of their rounded shape terminating in a point at the ends of the connection lines with the first portions 42a, 44a of the side wall, the second portions 42b, 44b of the side wall have limited impact on the flow of the bypass stream. Preferably, it is ensured that these second portions 42b, 44b of the side wall occupy at most less than 2% of the ejection from the bypass stream flow passage, i.e. less than 2% of the ejection section of the secondary nozzle, ignoring the casing.

In order to disturb the flow of the bypass stream as little as possible, each second portion 42b, 44b of the wall preferably presents curved profiles of generally concave shape both in longitudinal section (in the flow direction of the bypass stream) and in cross-section (perpendicularly to the flow direction of the bypass stream). The curvature (reciprocal of the radius of curvature) along the profiles in the flow direction of the bypass stream is preferably greater than $2 \times 10^{-4}$ per millimeter ($mm^{-1}$), while the curvature along profiles perpendicular to the flow direction of the bypass stream is preferably greater than $5 \times 10^{-3}$ $mm^{-1}$.

Advantageously, the second portions 42b, 44b of the side wall are streamlined to enhance locally a flow of the bypass stream towards the inside and under the rear portion of the rear covering 40, thus making it possible in the region situated under said rear portion of the covering 40 to contribute to "pressing" the core steam against the central body 17, thus optimizing thrust and protecting the soleplate 46 from the core stream. This results from the above-defined curvature for the second portions 42b, 44b of the side wall and from the concave sides of their rear portions that make it possible to have flow paths that are appropriate for the bypass stream along front portions of the connection lines between the second wall portions 42b, 44b and the first wall portions 42a, 44a.

The first portion 42a, 44a of the side wall and the soleplate 46 of the covering 40 may be fastened to the mast 22. The second portions 42b, 44b of the side wall may be secured to the first portions or they may be fastened to the primary cover 32.

It should be observed that the shape of the second portions 42b, 44b of the side wall make it possible to have an impact that is limited not only on the flow of the bypass stream, but also on the total weight of the rear covering 40.

It should also be observed that the number of rear attachments could be greater than two.

The invention claimed is:

1. An assembly comprising a turbine engine and an attachment system for attaching the turbine engine to an aircraft structure;
    wherein the turbine engine is a bypass engine including an annular passage in which a core stream flows that opens out to a rear around a central body and an annular passage along which a bypass stream flows that opens out to a rear between a primary cover and a rear end of a secondary cover, and
    wherein the attachment system includes a mast, at least two rear attachments connecting the mast to two rear attachment points of the turbine engine, and a rear covering of the mast covering the rear attachments, providing a streamlined fairing and having a rear portion that extends rearwards beyond an opening of the core stream flow passage, a distance between the rear attachment points being substantially greater than a width of the mast level with the rear attachments;
    wherein the rear covering includes two side walls each including a first portion extending along and in proximity of the mast and extended rearwards, and a second portion that projects sideways relative to the first wall portion on an outside thereof to cover the rear attachments; and
    wherein the second portions of the side wall of the rear covering are substantially in a form of bulges and connect to the first portions of the side wall along curved connection lines extending between front points and rear points situated substantially level with inner longitudinal edges of the first side wall portions.

2. An assembly according to claim 1, wherein the second side wall portions of the rear covering are connected to the first side wall portions along curved connection lines extending rearwards as far as rear points situated at or in proximity of an outer edge of the opening of the annular flow passage for the core stream.

3. An assembly according to claim 2, wherein the second side wall portions of the rear covering have curved profiles of generally concave shape to locally favor a flow of the bypass stream towards an inside and under a rear portion of the rear covering.

4. An assembly according to claim 1, wherein the second side wall portions of the rear covering are connected to the first side wall portions along connection lines from front points situated in proximity of the primary cover substantially facing a rear edge of the secondary cover.

5. An assembly according to claim 1, wherein the second side wall portions of the rear covering occupy less than 2% of an ejection of the annular passage for the bypass stream.

* * * * *

UNITED STATES PATENT AND TRADEMARK OFFICE
CERTIFICATE OF CORRECTION

PATENT NO. : 9,488,106 B2
APPLICATION NO. : 14/241246
DATED : November 8, 2016
INVENTOR(S) : Gaillot et al.

It is certified that error appears in the above-identified patent and that said Letters Patent is hereby corrected as shown below:

On the Title Page

Item (30), the Foreign Application Priority Data Information has been omitted. Item (30) should read:
-- (30) Foreign Application Priority Data
Sept. 1, 2011    (FR).......................1157747 --

Signed and Sealed this
Tenth Day of April, 2018

Andrei Iancu
*Director of the United States Patent and Trademark Office*